United States Patent
Woodbury

(10) Patent No.: US 12,280,783 B2
(45) Date of Patent: Apr. 22, 2025

(54) AUTONOMOUS NARROW VEHICLE LANE SHARING, FILTERING, AND SPLITTING SYSTEM

(71) Applicant: Commuter Cars Corporation, Spokane, WA (US)

(72) Inventor: Richard Winston Woodbury, Spokane, WA (US)

(73) Assignee: Commuter Cars Corporation, Spokane, WA (US)

( * ) Notice: Subject to any disclaimer, the term of this patent is extended or adjusted under 35 U.S.C. 154(b) by 169 days.

(21) Appl. No.: 18/133,188

(22) Filed: Apr. 11, 2023

(65) Prior Publication Data

US 2024/0317232 A1    Sep. 26, 2024

Related U.S. Application Data

(60) Provisional application No. 63/453,818, filed on Mar. 22, 2023.

(51) Int. Cl.
*B60W 30/18* (2012.01)
*B60W 60/00* (2020.01)

(52) U.S. Cl.
CPC .... *B60W 30/18163* (2013.01); *B60W 60/001* (2020.02); *B60W 2530/201* (2020.02);
(Continued)

(58) Field of Classification Search
CPC ......... B60W 30/18163; B60W 60/001; B60W 2530/201; B60W 2552/05;
(Continued)

(56) References Cited

U.S. PATENT DOCUMENTS

2017/0169710 A1* 6/2017 Beaurepaire ........... G08G 1/163
2018/0275650 A1* 9/2018 Nelson ..................... B62J 50/25
(Continued)

FOREIGN PATENT DOCUMENTS

KR         102400555 B1 *  5/2022
WO    WO-2020041191 A1 *  2/2020  ............ B60W 50/14

OTHER PUBLICATIONS

Richard Woodbury, "Introducing the Tango: The World's Fastest Car through Traffic", 2021, Youtube, https://www.youtube.com/watch?v=qTI1PLBtycU&t (Year: 2021).*
(Continued)

*Primary Examiner* — Hussein Elchanti
*Assistant Examiner* — Kenneth M Dunne
(74) *Attorney, Agent, or Firm* — Lee & Hayes, P.C.

(57) ABSTRACT

Techniques for dividing a lane into a first virtual lane and a second virtual lane are described. A narrow track vehicle may determine that the narrow track vehicle is traversing a lane that is at least 10 feet wide. The narrow track vehicle may divide the lane into a first virtual lane and a second virtual lane and traverse one of the first virtual lane or the second virtual lane based at least in part on location (e.g., when traversing a highway lane, residential lane, etc.) and/or speed of traffic (e.g., when traffic is traveling at or below a threshold speed). In examples, the narrow track vehicle may traverse the environment in between a first lane and a second lane upon determining that a distance between a first object in the first lane and a second object in the second lane meets a threshold distance.

20 Claims, 4 Drawing Sheets

(52) U.S. Cl.
CPC ..... *B60W 2552/05* (2020.02); *B60W 2552/10* (2020.02); *B60W 2554/4042* (2020.02); *B60W 2554/4045* (2020.02); *B60W 2554/4046* (2020.02); *B60W 2554/4049* (2020.02); *B60W 2720/10* (2013.01)

(58) Field of Classification Search
CPC . B60W 2554/4042; B60W 2554/4045; B60W 2554/4046; B60W 2552/10; B60W 2554/4049; B60W 2720/10
See application file for complete search history.

(56) References Cited

U.S. PATENT DOCUMENTS

| | | | | |
|---|---|---|---|---|
| 2019/0302795 | A1* | 10/2019 | Kobayashi | G05D 1/0246 |
| 2019/0384293 | A1* | 12/2019 | Yoo | B60W 30/16 |
| 2021/0171026 | A1* | 6/2021 | Pfau | B60W 30/095 |
| 2021/0245740 | A1* | 8/2021 | George | B60W 30/18163 |
| 2023/0040881 | A1* | 2/2023 | Yamada | B60W 50/0097 |
| 2023/0278573 | A1* | 9/2023 | Berniolles | B60W 30/09 701/70 |
| 2023/0298362 | A1* | 9/2023 | Zhang | G06T 7/60 382/103 |
| 2023/0347887 | A1* | 11/2023 | Favreau | B60W 40/09 |
| 2024/0025401 | A1* | 1/2024 | Hosokawa | B60W 10/20 |

OTHER PUBLICATIONS

Utah Department of Public Safety, "Motorcycle Lane Filtering", 2020, Utah State Government Department of Public Safety (Year: 2020).*

Microcar NZ Ltd, "Can cars do filtering and lane splitting like motorcycles?", 2018, Facebook (Year: 2018).*

Machine Translation of KR 102400555 B1 (Year: 2022).*

Triggo, "Triggo | CES 2022 in Las Vegas", Feb. 11, 2022, https://www.youtube.com/watch?v=9uQjU4osZHA (Year: 2022).*

* cited by examiner

AUTONOMOUS NARROW VEHICLE LANE SHARING, FILTERING, AND SPLITTING SYSTEM

RELATED APPLICATIONS

The present application claims the benefit of and priority to U.S. Provisional Patent Application No. 63/453,818 filed on Mar. 22, 2023, entitled "AUTONOMOUS NARROW VEHICLE LANE SHARING, FILTERING, AND SPLITTING SYSTEM," which is incorporated by reference herein in its entirety.

BACKGROUND

As the population of urban areas continues to expand, traffic congestion and parking issues have become more prevalent. Vehicles used for commuting often only carry a single person, which adds to the traffic congestion problem. City governments have had limited success in encouraging the public to carpool or use public transportation. Furthermore, traditional approaches of building more roadways and parking facilities have largely been unsuccessful in solving these issues. As such, there is a need for a vehicle and vehicle system that decreases traffic congestion and provides additional parking options.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
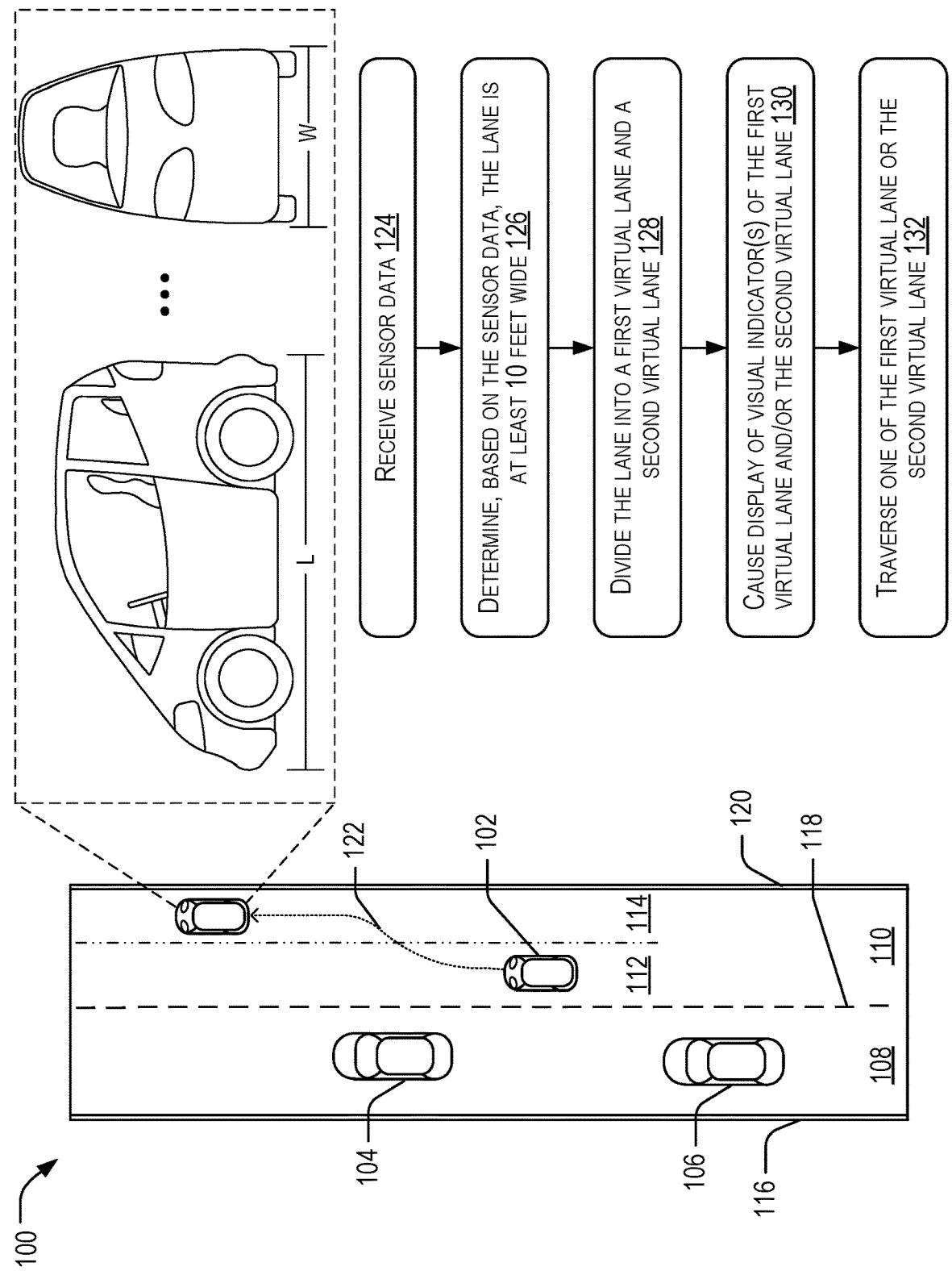
FIG. 1 illustrates an example environment for controlling a narrow track vehicle to traverse one of a first virtual lane or a second virtual lane, as described herein.

As discussed above, the number of vehicles on the world's roads will continue to increase over the coming years. Many drivers in urban areas report spending one quarter of their driving time in traffic jams, which result in wasted time, fuel, and increased air pollution. Techniques described herein provide increased efficiency in route planning through the use of vehicles with a narrow body shape, such as narrow track vehicles, especially in areas of dense traffic. That is, by treating a standard lane as two separate virtual lanes as described herein, narrow track vehicles may greatly reduce traffic congestion. Traffic congestion can be further reduced, in some examples, by automating the ability of such narrow track vehicles to determine when lane sharing, splitting, or filtering is appropriate (e.g., legal, safe, and beneficial) and autonomously control navigation of such narrow track vehicles to perform maneuvers such as lane sharing, splitting, or filtering.

For the purposes of this disclosure, "lane sharing" is the process of dividing a lane into two virtual lanes and controlling the narrow track vehicle to traverse one of the virtual lanes. This enables the narrow track vehicle to travel alongside another narrow vehicle (e.g., another narrow track vehicle, motorcycle, scooter, etc.) or in staggered formation, while still allowing a doubling of lane capacity. For the purposes of this disclosure, "lane splitting" is the process of controlling a narrow track vehicle to traverse in between stopped or moving vehicles on a highway or 2-or-more lane roads. For the purposes of this disclosure, "lane filtering" is the process of controlling a narrow track vehicle to traverse in between two lanes of stationary objects (e.g., vehicles stopped at an intersection).

Techniques described herein relate to identifying a lane that is at or above a threshold lane width and dividing, in internal mapping and control components, the lane into a first virtual lane and a second virtual lane. In some examples, the threshold lane width may be 10 feet (about 3 meters). A "virtual lane" as described herein may be a continuous space that constitutes a portion of (e.g., half of) a standard lane where the narrow track vehicle 102 can move. In some examples, the virtual lane may have a virtual lane width that is about half the width of the standard lane. In some examples, a lane may be divided into two unequal virtual lane widths based at least in part on a width of the lane (e.g., 10 feet versus 12 feet, or determining that the lane is below a threshold lane width), location of the lane (e.g., a highway lane versus a city street) and/or on the speed of surrounding vehicles. Thus, an autonomous control component of the narrow track vehicle may treat a single lane of traffic as multiple separate virtual lanes, and may control the narrow track vehicle to navigate in one or more of the virtual lanes.

In some examples, the narrow track vehicle may automatically traverse one of the virtual lanes based on whether the narrow track vehicle is traversing a highway lane or a residential lane (e.g., a lane located within an urban area, city, residential area, etc.). For example, when traversing a middle lane of a three-lane highway, the narrow track vehicle may default to a virtual lane on the right side of the highway lane in order to allow traffic to easily pass in the leftmost highway lane (i.e., the passing lane). In some examples, when traversing a residential lane within an urban area, the narrow track vehicle may default to a virtual lane on the left side of the residential lane in order to provide additional space to bicyclists (e.g., for bicyclists using a bicycle lane), parked vehicles, pedestrians, etc.

In some examples, the narrow track vehicle may perform a virtual lane change operation based in part on detecting something in the environment (e.g., an obstruction in one of the virtual lanes), detecting erratic behavior from a vehicle traveling adjacent the narrow track vehicle, and/or upon receiving an instruction from an occupant (e.g., driver) of the narrow track vehicle (e.g., upon detecting a turn signal).

In some examples, the narrow track vehicle may refrain from performing a lane filtering or lane splitting operation in circumstances where it is not physically feasible (e.g., when the narrow track vehicle does not have sufficient space to fit in between objects). In some examples, the narrow track vehicle may refrain from performing a lane splitting operation in circumstances when an object traveling proximate the narrow track vehicle is driving erratically (e.g., as measured by a variation of the vehicle's position in the environment relative to a lane over time, acceleration/deceleration rate, etc.), and/or when the threshold speed of traffic is at or above a threshold speed (e.g., at or above 50 mph). In some examples, when overtaking (i.e., passing) vehicles during a lane splitting operation, a speed of the narrow track vehicle may be controlled so that it is between a minimum overtaking speed (e.g., at least 1 mph) and a maximum overtaking speed (e.g., at most 15 mph above a speed of the vehicle(s) the narrow track vehicle is passing). In some examples, the minimum and/or maximum overtaking speed may be based on location (e.g., highway versus residential lane), state regulations (e.g., California, Washington, etc.), and/or on a speed of a vehicle the narrow track vehicle is overtaking.

While techniques described herein are described in the context of dividing a lane into a first virtual lane and a second virtual lane, techniques described herein may be similarly useful for performing other operations, such as parking operations (e.g., dividing a standard parking spot into a first virtual parking spot and a second virtual parking spot), and/or the like.

FIG. 1 illustrates an example environment 100 (e.g., a top-down view thereof) for controlling a narrow track vehicle 102 to traverse one of a first virtual lane 112 or a second virtual lane 114, as described herein. In some examples, a narrow track vehicle may have a width that is at most half the width of a standard lane. A standard lane width in the United States may range from about 9 feet to about 12 feet wide, depending on the type and/or location of the lane (e.g., a standard freeway lane has a width of 12 feet). In some examples, a narrow track vehicle may have a width ranging from about 28 inches to about 60 inches. In at least one example, a narrow track vehicle may be a vehicle that is at most 40 inches wide (about 1 meter) in order to provide improved maneuverability in traffic and parking. In some examples, a narrow track vehicle may have a length of about 6 feet (1.83 meters). In some examples, the narrow track vehicle is at most 8.5 feet (about 2.6 meters) in length. A narrow track vehicle allows for two of the present vehicles to be driven side-by-side on a single lane. In some examples, the narrow track vehicle may include two or more seats positioned in tandem within the cabin. In some examples, fewer or more seats may be provided as long as they are arranged in a single column to maintain the narrow width of the body. In some examples, two seats within the cabin may be positioned so that they face each other, similar to a carriage-style vehicle. In some examples, the narrow track vehicle may include any number of wheels (e.g., 3 wheels, 4 wheels, 6 wheels, etc.).

In some examples, the narrow track vehicle 102 may be positioned on a drivable surface (e.g., a roadway) that includes one or more lanes. For example, FIG. 1 illustrates two lanes: a first lane 108 positioned on the left side of the roadway and a second lane 110 positioned on the right side of the roadway. In some examples, the first lane 108 and/or the second lane 110 may include any number of objects (e.g., vehicle 104, vehicle 106, motorcycle(s), trucks(s), scooter (s), etc.). In some examples, a location determination component and/or a perception component associated with the narrow track vehicle 102 may determine that the narrow track vehicle is traversing on a roadway that includes two lanes (e.g., first lane 108 and second lane 110) based at least in part on detecting a first solid line 116 on the far left of the road, a second solid line 120 on the far right of the road, and a broken line 118 in between the first solid line 116 and the second solid line 120.

In some examples, the narrow track vehicle 102 may detect and identify various attributes of an environment surrounding the narrow track vehicle 102. For example, sensors associated with the narrow track vehicle may generate sensor data describing the environment and other objects (e.g., other vehicles, pedestrians, street signs, lanes, crosswalks, etc.) within at least a portion of the area surrounding the narrow track vehicle. In examples, a camera(s) associated with the narrow track vehicle 102 may generate images of the environment surrounding the narrow track vehicle 102, including images of the road, painted road markers (e.g., lane markers), lane boundaries, lane edges (e.g., medians, shoders, curbs, raised pavement markers, etc.), sidewalks, crosswalks, or other visual indicators. The narrow track vehicle 102 may then use the captured images of the environment to identify lane(s) on a roadway. The narrow track vehicle may identify a lane based on the positions of the detected lane markers in the environment and/or based on the type of detected lane marker (e.g., whether the lane marker is yellow or white, broken or solid, dotted, single or doubled, etc.). In some examples, the narrow track vehicle 102 may identify one or more lanes based at least in part on detecting variations in reflectance intensity (e.g., using lidar data). For example, a lane marker may be charactered by a higher reflectance intensity relative to surrounding non-marked portions of the road.

At operation 124, the narrow track vehicle receives sensor data from at least one sensor disposed on the narrow track vehicle 102 while traversing the environment 100. The sensor may be associated with a sensor component(s) that include lidar sensors, radar sensors, ultrasonic transducers, sonar sensors, location sensors (e.g., GPS, compass, etc.), inertial sensors (e.g., inertial measurement units, accelerometers, magnetometers, gyroscope, etc.), cameras (e.g., RGB, IR, intensity, depth, etc.), wheel encoders, audio sensors, environmental sensors (e.g., temperature sensors, humidity sensors, light sensors, pressure sensors, etc.), time-of-flight (ToF) sensors, seat sensors, seatbelt sensors, weight sensors, etc. The sensor component(s) can generate sensor data and, in some examples, can provide input to vehicle computing device(s) associated a narrow track vehicle, as described below with reference to FIG. 4.

At operation 126, a virtual lane component associated with the narrow track vehicle 102 determines, based at least in part on the sensor data, that the lane (e.g., second lane 110) has a lane width that is at or above a threshold lane width. In some examples, the threshold lane width may be at least 10 feet in order to provide adequate driving space between vehicles when the lane is divided into two virtual lanes. In some examples, the first lane and/or the second lane may have a travel width of between 9 feet (about 2.7 meters) and 12 feet (about 3.7 meters). In some examples, the first lane and/or the second lane may have a standard lane width as considered to be appropriate in urban areas, rural areas, or to meet the Interstate Highway standards for the Interstate Highway System.

At operation 128, the virtual lane component may divide, based at least in part on the second lane 110 being at least 10 feet wide, the second lane 110 into a first virtual lane 112 associated with a left half of the lane and a second virtual lane 114 associated with a right half of the lane. In some examples, the virtual lane may have a virtual lane width that is about half the width of the standard lane. For example, if a lane is about 12 feet wide (e.g., a standard highway lane), a first virtual lane may be about 6 feet wide and a second virtual lane may be about 6 feet wide. In another example, if a lane is about 10 feet wide (e.g., a standard lane in an urban area or residential area), a first virtual lane may be about 5 feet wide and a second virtual lane adjacent the first virtual lane may be about 5 feet wide. In some examples, the narrow track vehicle 102 may be controlled to automatically traverse a center of the virtual lane. In any one or more of the examples described herein, the two virtual lanes may be determined relative to a particular lane.

In some examples, a virtual lane component associated with the narrow track vehicle 102 may divide a lane into equal or non-equal virtual lanes based at least in part the environment and/or location of the lane. For example, a narrow track vehicle 102 may divide a middle 12-foot-wide highway lane (e.g., in a three-lane highway) into a first virtual lane comprising the left side of the lane that is 6.3 feet wide and a second virtual lane comprising the right side of the lane that is 5.7 feet wide in order to account for traffic that is moving faster in the passing lane of the three-way highway.

In some examples, a virtual lane component associated with the narrow track vehicle 102 may divide a lane into equal or non-equal virtual lanes based at least in part on a size of the lane. For example, the virtual lane component may divide a 12 foot wide lane into two unequally sized virtual lanes (i.e., a first virtual lane of a first width and a second virtual lane of a second width different than the first width) while dividing a 10 foot wide lane into substantially equally sized virtual lanes.

In some examples, the virtual lane component may divide a lane (e.g., a single lane road, one-way street, etc.) into two virtual lanes regardless of the width of the lane. In some examples, the virtual lane component may divide a lane into two unequally sized virtual lanes regardless of the width of the lane. Dividing a lane into two virtual lanes enables the narrow track vehicle to be controlled to stay on one side of the lane or the other. For example, a lane that has a width of less than 9 feet may still be divided into two virtual lanes where one of the two virtual lanes may have a width that does not allow two narrow vehicles to drive alongside each other, but still leaves room for a motorcycle or scooter to drive alongside the narrow track vehicle. Furthermore, dividing a lane that is below a threshold width into two unequally sized virtual lanes enables the narrow track vehicle to keep to one side or portion of the lane (i.e., by traversing along the center of one of the virtual lanes) in order to increase the visibility to other drivers (i.e., improves the line of sight). Additionally, controlling the narrow track vehicle to traverse on one side of a lane (as opposed to the center of a lane) is in line with guidelines for motorcyclists provided by the Motorcycle Safety Foundation of the National highway Traffic Safety Administration (NHTSA). Traversing one of the two virtual lanes enables the narrow track vehicle to maintain a steady trajectory (e.g., by keeping the narrow track vehicle to one side of the lane) while traversing the virtual lane and provides more room for other vehicles to pass adjacent the unoccupied virtual lane (i.e., the virtual lane the narrow track vehicle is not traversing). For example, a lane that has a width of 9 feet may be divided into a first virtual lane that is 5 feet wide and comfortably traversable and a second virtual lane that is 4 feet wide. In this particular example, the second virtual lane may be too narrow for another narrow track vehicle to comfortably traverse alongside the narrow track vehicle but may still allow a motorcycle to pass or traverse alongside the narrow track vehicle. As another example, the virtual lane component associated with the narrow track vehicle may divide an 8 foot wide lane into a first virtual lane that is 5 feet wide and a second virtual lane that is 3 feet wide and cause the narrow track vehicle to traverse the first virtual lane.

In some examples, a virtual lane component associated with the narrow track vehicle 102 may divide a lane into equal or non-equal virtual lanes based at least in part on the direction of traffic in an adjacent lane or the speed of traffic in the environment which the narrow track vehicle is traversing. For example, the virtual lane component may determine, based at least in part on sensor data, that the narrow track vehicle is traversing an undivided road (e.g., undivided highway or single carriageway) where there is no central reservation or meridian to separate opposing flows of traffic. For example, an undivided road may include a first lane and a second lane adjacent the first lane, where the second lane includes traffic that is moving in the opposite direction of traffic in the first lane. In this instance, the virtual lane component may divide the lane into unequally sized virtual lanes where the first virtual lane (or left virtual lane) may have a larger width as compared to the second virtual lane (or right virtual lane) in order to account for the first virtual lane being closer to the opposing traffic lane (i.e., the second lane).

In some examples, the virtual lane component may divide the lane into a first virtual lane (or left virtual lane) having a first width and a second virtual lane (or right virtual lane) having a second width different than the first width based at least in part on the speed of traffic. For example, the virtual lane component may divide a lane (e.g., a middle highway lane in a three-lane highway) into a first virtual lane comprising a left half of the lane and a second virtual lane comprising the right half of the virtual lane. The virtual lane component may then determine, based at least in part on sensor data, that the first virtual lane is adjacent a passing lane (e.g., based at least in part on detecting traffic moving faster in the passing lane, detecting the positions of solids lines relative to broken lines on the roadway) and adjust a width of the first virtual lane in order to leave more room for passing vehicles traveling at higher speeds.

While two virtual lanes (first virtual lane 112 and second virtual lane 114) are illustrated in FIG. 1, in some examples, the virtual lane component may divide adjacent lanes into virtual lanes in order prepare the narrow track vehicle for a lane change or virtual lane change operation (i.e., move from the first virtual lane 112 into the right half of the first lane 108) or to prepare the narrow track vehicle for a lane filtering or lane splitting process. For example, while traversing the second lane 110, the virtual lane component of the narrow track vehicle may divide the first lane 108 into a third virtual lane associated with a left half of the first lane 108 and a fourth virtual lane associated with a right half of the first lane 108 in order to prepare for a virtual lane change operation.

At operation 130, the virtual lane component may cause virtual lane indicator(s) to be displayed to a driver or passenger (e.g., on a head-up display on a windshield, on a window of the narrow track vehicle, on a display screen in the passenger compartment, etc.). Virtual lane indicators may be used to visually depict how a single lane has been divided into two virtual lanes and enables a driver or passenger of the narrow track vehicle to easily see the two virtual lanes. In some examples, a virtual lane indicator displayed on a windshield, window, and/or a display screen within the narrow track vehicle may include a line (e.g., a solid line, dashed line, blinking line, etc.) dividing a lane into a first virtual lane and a second virtual lane. In some examples, the drivable surface of a first virtual lane may be depicted on the display in a first color (e.g., red, green, etc.) or pattern (e.g., shaded, striped, etc.) and the drivable surface of a second virtual lane may be depicted on the display in a second color or pattern different than the first color or pattern. In some examples, only one of the two virtual lanes (e.g., the virtual lane the narrow track vehicle is currently traversing) is highlighted or emphasized on the display (e.g., depicted in a different color and/or pattern). In some examples, the virtual lane component may present additional information such as the width of the lane, a width of the first virtual lane, a width of the second virtual lane, and/or present notifications of certain driving operations such as when the narrow track vehicle is about to perform a virtual lane operation.

In some examples, the virtual lane component may refrain from dividing the lane into two virtual lanes. For example, the virtual lane component may determine, based at least in part on sensor data, that the lane is at or below a threshold width (e.g., 9.9 feet wide, 9.5 feet wide, 9 feet wide, etc.) and refrain from dividing the lane into a first virtual lane and a second virtual lane and treat the lane as a single lane. In some examples, the virtual lane component may refrain from dividing the lane into two virtual lanes based at least in part on a time of day (between 1:00 am and 6:00 am when there is less traffic), when in the right-most lane on a highway (e.g., the merging lane), when merging onto the highway or freeway, when in a roundabout intersection, when in a parking lot, when on a dirt or gravel road, when in a turning lane, when the speed limit on a roadway (e.g., highway or interstate) is at or above a threshold speed limit (e.g., above 65 miles per hour), and the like.

At operation 132, one or more drive system(s) associated with the narrow track vehicle 102 may cause the narrow track vehicle 102 to traverse one of the first virtual lane 112 or the second virtual lane 114. The drive system(s) may control the narrow track vehicle 102 to traverse a center of a virtual lane. In some examples, the narrow track vehicle may use map data and/or sensor data to determine information about the environment including driving lanes, solid lane lines, dash lane lines, drivable surfaces, non-drivable surfaces, and the like. The narrow track vehicle may use the map data and/or sensor data to position the narrow track vehicle within the virtual lane (e.g., within a center of the virtual lane). Lane markings on the right and/or left side of the lane may be used to position the narrow track vehicle on one side of the lane. For example, if the right lane markings disappear (e.g., because of an offramp) and no longer detected, the narrow track vehicle may use the left lane markings at least in part to determine a trajectory for traversing a virtual lane.

In some examples, the one or more drive system(s) associated with the narrow track vehicle 102 may cause the narrow track vehicle 102 to traverse one of the two virtual lanes (e.g., first virtual lane 112 or the second virtual lane 114). For example, the virtual lane component may determine, based at least in part on sensor data, that the lane is a highway lane (e.g., based on location or map data, speed of traffic, speed limits, etc.) and control the narrow track vehicle 102 to traverse the second virtual lane associated with the right side of the highway lane. This enables vehicles to have more space to pass on the left side of the narrow track vehicle when traveling at higher speeds. In some examples, the virtual lane component may determine that the speed limit is at or above a threshold speed limit (e.g., 50 mph, 55 mph, 60 mph, etc.) and/or that traffic around the narrow track vehicle is moving at or above a threshold speed (e.g., 50 mph, 55 mph, 60 mph, etc) and control the narrow track vehicle 102 to traverse the second virtual lane associated with the right side of the lane based on the speed limit being at or above the threshold speed or the speed of traffic adjacent the narrow track vehicle being at or above a threshold speed.

In some examples, the narrow track vehicle may determine, based at least in part on sensor data, that another narrow vehicle (e.g., narrow track vehicle, motorcycle, scooter, etc.) has divided a standard lane into two virtual lanes and is traversing a virtual lane adjacent the narrow track vehicle. In some examples, the narrow track vehicle may adjust a speed and/or position of the narrow track vehicle so that the narrow track vehicle is in a staggered formation relative to the other narrow vehicle (i.e., so as not to be exactly side-by-side). In some examples, the narrow track vehicle may position itself in a staggered formation relative to other narrow vehicles based at least in part on determining that the narrow track vehicle and/or the other narrow track is traveling at or above a threshold speed (e.g., above 50 mph, 55 mph, 60 mph, etc.).

In some examples, the virtual lane component may determine, based at least in part on the sensor data, that the lane is a residential lane or a lane located in an urban area (e.g., based on location or map data, speed data, etc.) and control the narrow track vehicle 102 to traverse the first virtual lane associated with the left side of the residential lane. This provides more space on the road for pedestrians, cyclists, parked vehicles, and the like, and decreases the chance of a potential collision with the narrow track vehicle. In some examples, the virtual lane component may determine that the speed limit is at or below a threshold speed limit (e.g., 30 mph, 45 mph, 60 mph, etc.) and/or that traffic around the narrow track vehicle is moving at or below a threshold speed (e.g., 30 mph, 45 mph, 60 mph, etc.) and control the narrow track vehicle 102 to traverse the first virtual lane associated with the left side of the lane.

In some examples, an autonomous controller associated with the narrow track vehicle may help the narrow track vehicle 102 perform a virtual lane change operation. For example, an autonomous controller associated with the vehicle computing device(s) of the narrow track vehicle 102 may determine a trajectory (e.g., trajectory 122) for causing the narrow track vehicle 102 to perform a virtual lane change operation in the environment 100. In some examples, the autonomous controller may validate the trajectory 122 associated with the virtual lane change operation (e.g., indicate the trajectory 122 is feasible) and determine that the trajectory 122 may be used to cause the narrow track vehicle 102 to perform the virtual lane change operation in the environment 100. In some examples, multiple potential trajectories may be generated for performing the virtual lane change operation. In such examples, individual potential trajectories may be compared in order to find a best potential virtual lane change operation (e.g., a potential trajectory that minimizes the chance of a collision with another object in the environment when performing the virtual lane change operation). In at least one example, the trajectory 122 may be used to control the narrow track vehicle 102 as illustrated in FIG. 1. That is, the autonomous controller may utilize the trajectory 122 to generate commands (e.g., steering, acceleration, deceleration, etc.) for causing the narrow track vehicle 102 to travel along the trajectory 122.

In some examples, the narrow track vehicle may indicate (e.g., using turn signals, light outputs on the vehicle, and/or warning sound, etc.) that the narrow track vehicle is about to perform or is actively performing a virtual lane change operation. For example, one or more lights on the body of the narrow track vehicle may be activated to indicate that the narrow track vehicle is about to move from one virtual lane to an adjacent virtual lane. In some examples, the narrow track vehicle may use a first signal (e.g., a first light output, warning sound, etc.) to indicate the narrow track vehicle is merging into a different lane (e.g., from a first virtual lane associated with a first lane to a second virtual lane associated with a second lane, the second virtual lane being adjacent the first virtual lane) and may use a second signal (e.g., a second light output, warning sound, etc.) to indicate the narrow track vehicle is moving between virtual lanes within the same lane.

In some examples, the virtual lane component may cause the narrow track vehicle 102 to perform a virtual lane change operation based at least in part on a sensor component(s) detecting an obstruction in the first virtual lane 112 or the second virtual lane 114. For example, a sensor component(s) may detect objects (e.g., broken glass from a collision, potholes, debris, trash, road construction equipment, speedbumps, a parked car, a pedestrian, a cyclist, ice, mailboxes, and any other constraints in the environment) in a first virtual lane 112 and cause the narrow track vehicle 102 to perform a virtual lane change operation and merge into a second virtual lane 114 adjacent the first virtual lane 112 (e.g., narrow track vehicle 102 traversing the second virtual lane 114 in FIG. 1). In some examples, the second virtual lane may be associated with an adjacent lane (e.g., first lane 108).

In some examples, the virtual lane component may cause the narrow track vehicle 102 to perform a virtual lane change operation based at least in part on detecting erratic behavior from an object (e.g., a vehicle, motorcycle, truck, etc.) in an adjacent lane. In some examples, erratic behavior may include an object that is swerving from side to side in an adjacent lane, accelerating above a threshold acceleration, driving too close to the narrow track vehicle (e.g., within 1 foot, 10 inches, 6 inches etc. of a side of the narrow track vehicle), and the like.

In some examples, the virtual lane component may cause the narrow track vehicle 102 to perform a virtual lane change operation based at least in part on detecting a turn signal to transition from the first virtual lane to the second virtual lane. For example, in the instance where the narrow track vehicle 102 has autonomous driving capability (e.g., the narrow track vehicle can operate according to a Level 4 classification issued by the U.S. National Highway Traffic Safety Administration, which describes a vehicle capable of operating in self-driving mode with the driver being able to intervene and control the vehicle at any time). In this particular example, a driver may override the narrow track vehicle's autonomous driving capability and control the narrow track vehicle to perform a virtual lane change operation by activating a right or left turn signal associated with the narrow track vehicle.

In some examples, the virtual lane component may cause the narrow track vehicle 102 to perform a virtual lane operation based at least in part on detecting another object traversing a virtual lane ahead of the narrow track autonomous vehicle. In some examples, the other object may be another narrow track vehicle, motorcycle, scooter, and the like. In some examples, the narrow track vehicle may determine that the object is moving below the speed limit, below a threshold speed, or is moving erratically. In examples, the narrow track vehicle 102 may perform a virtual lane change operation in order to position itself in a staggered (i.e., offset) formation relative to the other object, or in order to overtake (i.e., pass) the object.

Figure 2:
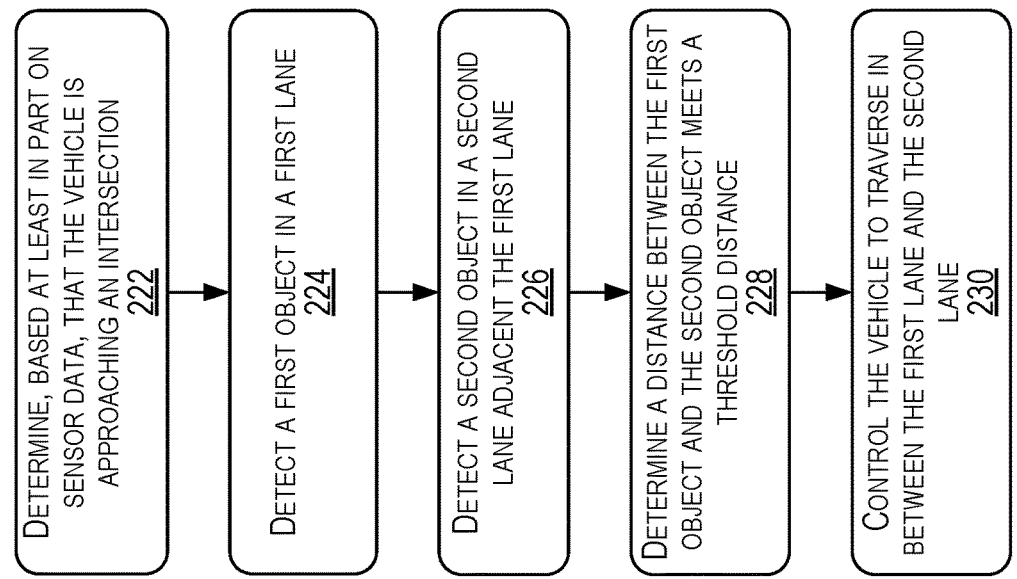
FIG. 2 illustrates an example environment for controlling the narrow track vehicle to perform a lane filtering operation, as described herein.
Figure 2:
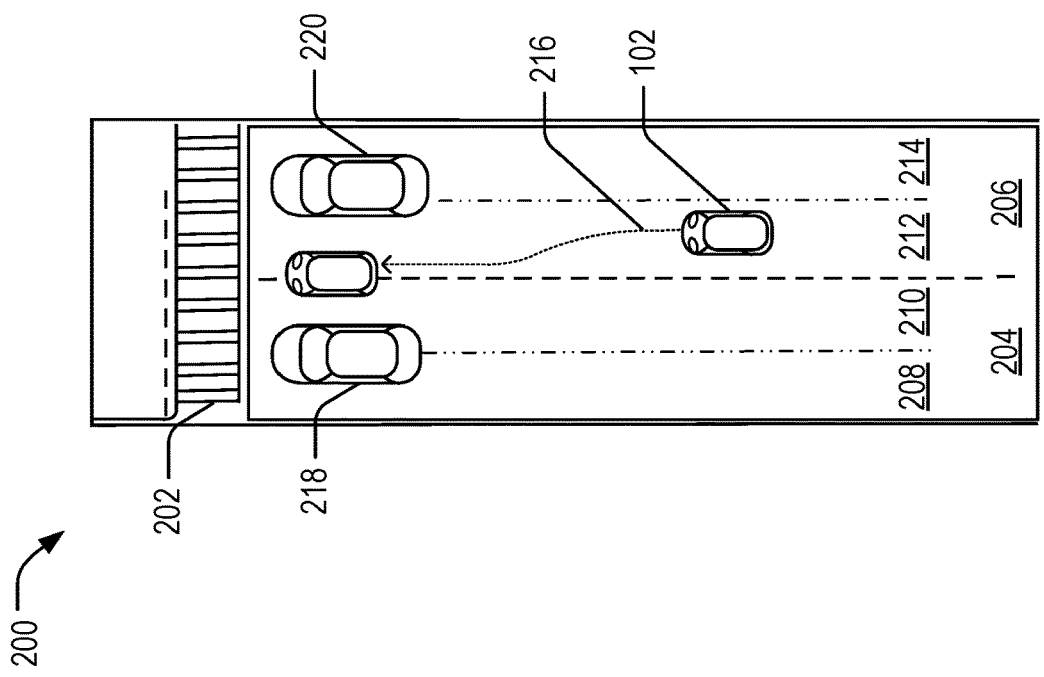

FIG. 2 illustrates an example environment 100 for controlling a narrow track vehicle 102 to perform a lane filtering operation, as described herein. In FIG. 2, a narrow track vehicle 102 is positioned in an environment 200 (a top-down view of which is illustrated in FIG. 2). In examples, the environment 200 may include a driving surface (e.g., a roadway) including an intersection 202. In examples, the environment 200 may include a first stationary object 218 (e.g., a first vehicle) in a first lane 204 (in front of the narrow track vehicle 102) and a second stationary object 220 (e.g., a second vehicle) in a second lane 206 adjacent the first lane 204. The first stationary object 218 and the second stationary object 220 may be stopped at an intersection 202, at a stop sign, etc. In some examples, the first lane 204 and the second lane 206 may be residential lanes or urban lanes located within a residential area or city. As discussed above, the virtual lane component may receive sensor data associated with sensor component(s), map data and determine whether a lane may be divided into two virtual lanes. In some examples, the virtual lane component may divide the first lane 204 into two virtual lanes (e.g., third virtual lane 208 and fourth virtual lane 210) and divide the second lane 206 into two virtual lanes (first virtual lane 212 and second virtual lane 214). In this this particular example, the narrow track vehicle 102 is traversing the first virtual lane 212 of the second lane 206 and can be associated with an intent to perform a lane filtering operation (associated with trajectory 216). Though FIG. 2 only depicts a first stationary object 218 and a second stationary object 220, any number of stationary objects may be detected in the environment 200.

At operation 222, the narrow track vehicle may determine, based at least in part on the sensor data, that the narrow track vehicle is approaching an intersection 202. In some examples, the narrow track vehicle may determine that traffic has stopped, is slowing down, or is moving below a threshold speed (e.g., less than 15 mph).

At operation 224, the narrow track vehicle 102 may detect a first stationary object 218 in the environment 200. In some examples, the narrow track vehicle 102 may determine a state associated with the first object (e.g., whether the first object is in the process of slowing down or is stationary, is autonomously controlled, etc.). In some examples, the narrow track vehicle may determine that the first object is a standard sized vehicle (such as a pickup truck, van, bus, tow car, etc.) or a vehicle having a narrow width, such as another narrow track vehicle, motorcycle, or scooter, etc. In some examples, the narrow track vehicle 102 may determine whether the first object is traveling down a center of the first lane 204, or whether the object is treating the first lane 204 as two virtual lanes and traveling on one side of the first lane (e.g., one of the third virtual lane 208 or the fourth virtual lane 210).

At operation 226, the narrow track vehicle 102 may detect a second stationary object 220 in a second lane 206 adjacent the first lane 204 in the environment 200. In some examples, the narrow track vehicle 102 may determine a state associated with the second object (e.g., whether the second object is in the process of slowing down or is stationary) as well as a classification associated with the second object (e.g., a size or type of vehicle).

At operation 228, the narrow track vehicle 102 may determine a distance between the first object and a first side of the narrow track vehicle meets a threshold distance. For example, the narrow track vehicle 102 may determine that there is at least 0.5 feet of space between the first object and a first side of the narrow track vehicle (or between and the first object's exterior mirror and an exterior mirror associated with the first side of the narrow track vehicle). The narrow track vehicle 102 may also determine a distance between the second object and a second side of the narrow track vehicle opposite the first side meets the threshold distance (e.g., at least 0.5 feet). In some examples, the threshold distance may be based at least in part on a state of the first object and/or the second object (e.g., whether the first and/or second object is stationary or moving). For example, a threshold distance between a stationary object and a side of the narrow track vehicle may be smaller (e.g., 0.5 feet) than a threshold distance between a moving object and a side of the narrow track vehicle (e.g., a 0.7 feet threshold distance may be required between a side of the narrow track vehicle and a moving object). In some examples, the threshold distance may be based at least in part on a size of the first object and/or the second object (e.g., a large dump truck or bus versus a compact car).

At operation 230, a drive system component may control the narrow track vehicle to traverse in between the first lane and the second lane. In some examples, this enables the narrow track vehicle to bypass traffic and "cut" to the front of an intersection.

In some examples, before performing a lane splitting or lane filtering operation, the narrow track vehicle may survey the environment to determine whether there is sufficient space to perform a lane splitting or lane filtering operation. For example, prior to performing a lane filtering operation, the drive system component may control the narrow track vehicle to move closer to an edge of a lane (e.g., closer to a dashed line between the first lane and the second lane) in order to better survey the environment (e.g., determine a distance between objects, a number of objects, etc.) and/or to determine how far ahead the narrow track vehicle may move between objects (e.g., whether the narrow track vehicle has sufficient space to reach an intersection). In some examples, prior to performing a lane filtering or lane splitting operation, the drive system may control the narrow track vehicle to move in between two lanes in order to better survey the environment. In at least one example, the lane filtering component may determine that there is not sufficient space between objects to move to a certain position (e.g., to reach an intersection or junction, overtake an object and merge into a lane, etc.) and the narrow track vehicle may refrain from performing a lane filtering operation.

In some examples, the narrow track vehicle 102 may perform a lane filtering process upon detecting traffic congestion in the environment (e.g., by detecting a number of stationary or slow moving vehicles), determining that a vehicle in front of the narrow track vehicle is driving below a threshold speed (e.g., below the speed limit) for a period of time over a threshold distance (e.g., more than 0.1 miles, 0.25 miles, etc.), upon determining that the first lane and the second lane are at or above a threshold width (e.g., at least 12 feet wide), etc. In some examples, a narrow track vehicle 102 may refrain from performing a lane filtering process based at least in part on determining that the first lane 204 is below a threshold lane width (e.g., less than 9 feet wide) and/or the second lane 206 is below the threshold lane width. In some examples, the narrow track vehicle 102 may refrain from performing a lane filtering process based at least in part on determining that the narrow track vehicle does not have sufficient space to proceed all the way to the front of an intersection.

Figure 3:
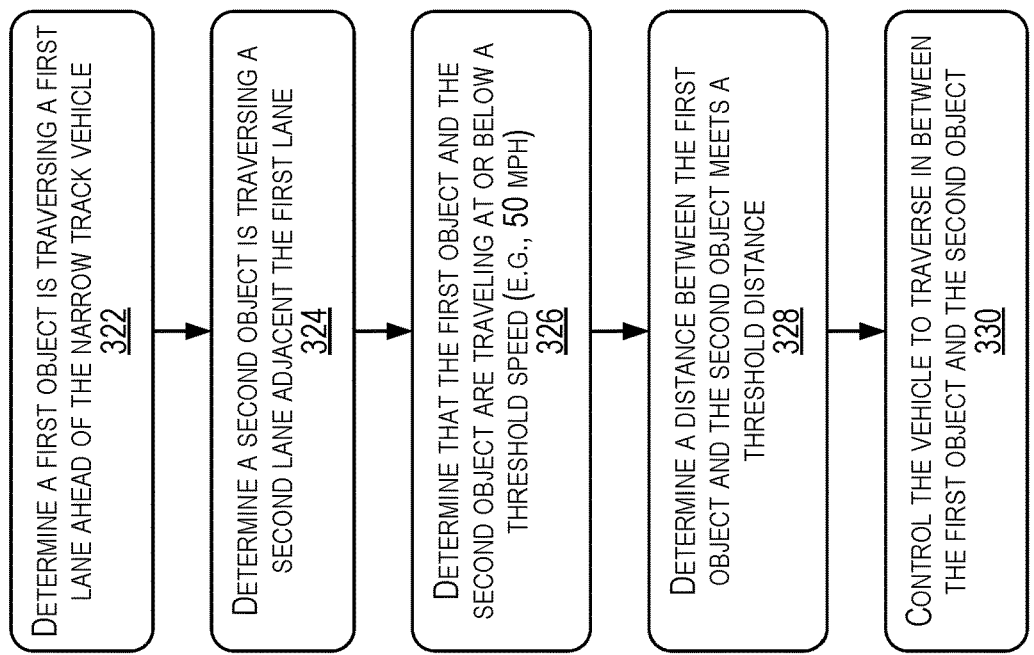
FIG. 3 illustrates another example environment for controlling a narrow track vehicle to perform a lane splitting operation, as described herein.
Figure 3:
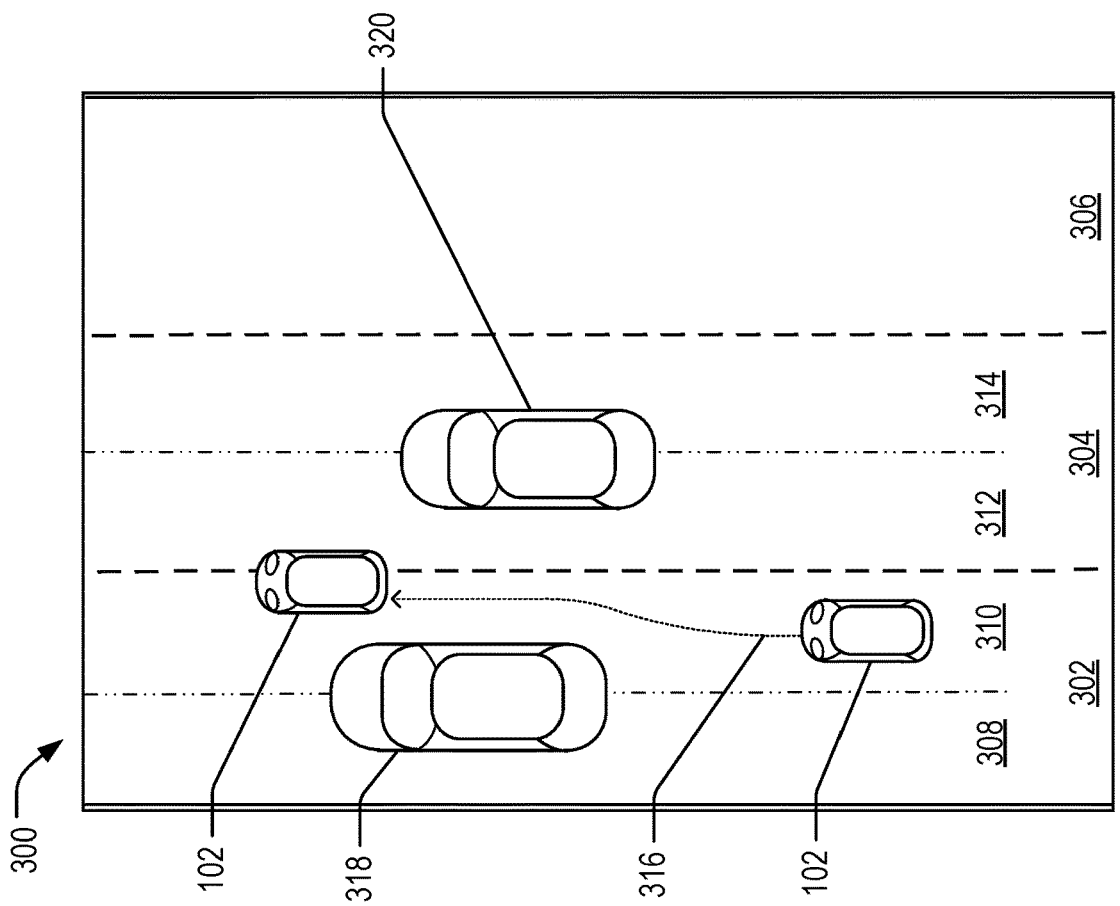

FIG. 3 illustrates another example environment 300 for controlling a narrow track vehicle to perform a lane splitting operation, as described herein. In some examples, a lane splitting component can receive sensor data associated with an environment 300 of the narrow track vehicle 102. In some examples, the lane splitting component can also receive map data associated with the environment 300. FIG. 3 illustrates a narrow track vehicle 102 positioned in an environment 300 (a top-down view of which is illustrated in FIG. 3). In examples, the environment 300 may include any number of objects (e.g., a first object 318 and a second object 320) traversing a number of lanes (e.g., a first lane 302, second lane 304, or third lane 306). In some examples, the first lane 302, second lane 304, and third lane 306 may be freeway lanes. As discussed above, the virtual lane component may receive sensor data associated with sensor component(s) and map data and determine whether a lane may be divided into two virtual lanes (e.g., dividing the first lane 302 into a first virtual lane 308 and a second virtual lane 310 and a second lane 304 into a third virtual lane 312 and a fourth virtual lane 314).

At operation 322, the narrow track vehicle 102 may determine, based at least in part on sensor data, that a first object 318 is traversing a first lane 302 ahead of the narrow track vehicle 102.

At operation 324, the narrow track vehicle 102 may determine, based at least in part on sensor data, that a second object 320 is traversing a second lane 304 adjacent the first lane 302.

At operation 326, the narrow track vehicle 102 may determine, based at least in part on sensor data, that the first object 318 and/or the second object 320 is driving below a threshold speed (e.g., below a speed limit, 50 mph, 55 mph, etc.). For example, the narrow track vehicle 102 may determine that the first object 318 and the second object 320 are traveling at or below 50 miles per hour. For example, the first object may be traveling at a first speed (e.g., 50 mph, 48 mph, etc.) while the second object may be traveling at a second speed (e.g., 45 mph, 42 mph, etc.). In some examples, if the narrow track vehicle 102 determines that either the first object 318 or the second object 320 is traveling above 50 mph, the narrow track vehicle will refrain from performing a lane splitting operation and not traverse in between the first object and the second object. In at least one example, the narrow track vehicle may perform a lane splitting operation regardless of the speed at which the first object 318 or the second object 320 are traveling (i.e., without regard to a threshold speed).

At operation 328, the narrow track vehicle 102 may determine, based at least in part on sensor data, that a distance between a first side of the first object 318 and a second side of the second object 320 meets a threshold distance. For example, the first side of the first object 318 may be a side that faces the second side of the second object 320. In some examples, a threshold distance between the first object 318 and the second object 320 may be at least 5 feet (about 1.5 meters) in order to allow a clearance of at about 10 inches of either side of the narrow track vehicle that is about 40 inches wide. In some examples, the threshold distance may be at least 4.4 feet in order to allow a clearance of about 6 inches on either side of the narrow track vehicle that is about 40 inches wide. In some examples, a threshold distance between the first object and the second object may be at least 4.2 feet (about 1.3 meters) in order to allow a clearance of about 5 inches on either side of the narrow track vehicle 102 that is about 40 inches wide. In some examples, the threshold distance between the first side of the first object 318 and a second side of the second object 320 may be based at least in part on the speed at which the first object 318, the second object 320, and/or the narrow track vehicle 102 are driving.

At operation 330, a lane splitting component and a drive system component associated with the narrow track vehicle 102 may control the narrow track vehicle 102 to traverse in between the first object 318 in the first lane 302 and the second object 320 in the second lane 304 (e.g., over a broken line between two adjacent lanes) in order to overtake the first object and the second object. For example, the narrow track vehicle may follow trajectory 316. In some examples, the overtaking speed may be associated with a minimum and/or a maximum overtaking speed. For example, a minimum overtaking speed of the narrow track vehicle 102 may be controlled to be at least 1 mph above a speed of the first object 318 and the second object 320 and a maximum overtaking speed may be at most 15 mph above the speed of the first object 318 and/or the second object 320. For example, if the first object is traveling at 48 mph, the lane splitting component may control the narrow track vehicle to overtake the first object at least at 49 mph and at most 63 mph and if the second object is traveling at 45 mph, the lane splitting component may control the narrow track vehicle to overtake the second object at least at 46 mph and at most 60 mph. In some examples, when the narrow track vehicle is overtaking multiple objects, the maximum overtaking speed may be based in part on the object that is traveling at a higher speed (e.g., the first object in the example above). In some examples, an overtaking speed of the narrow track vehicle may be controlled to be at least 1 and at most 10 mph above a speed of the first object and the second object. In some examples, the minimum and/or maximum overtaking speed may be based on location (e.g., highway versus residential lane) and/or state regulations (e.g., California, Washington, etc.). In some examples, the minimum and/or maximum overtaking speed(s) may be based at least in part on a speed of an object the narrow track vehicle is overtaking (e.g., the speed of the first object 318 and/or the speed of the second object 320). For example, the minimum and/or maximum overtaking speed may be different in Washington as compared to California. That is, a location determination component associated with the narrow track vehicle may be used to determine that the narrow track vehicle is traversing roads in a State having regulations that limit the maximum overtaking speed (e.g., to a maximum of 15 mph over the speed of the object the narrow track vehicle is passing) and adjust its overtaking speed accordingly.

In some examples, the maximum overtaking speed may be based on a percentage of the speed of the object the narrow track vehicle is overtaking. That is, the maximum overtaking speed may be 110%, 115%, 120% etc. of the speed of the object that narrow track vehicle is overtaking. For example, if the object is traveling at 40 mph, the maximum overtaking speed may be 44 mph (110% of the speed of the object). In another example, if the object is traveling at 50 mph, the maximum overtaking speed may be 60 mph (120% of the speed of the object).

In some examples, one or more light outputs on the narrow track vehicle may be configured to communicate to objects (e.g., other vehicles and/or pedestrians) in the environment that the narrow track vehicle is treating a single lane as two virtual lanes, is about to perform a lane splitting process, or is currently performing a lane splitting process. For example, the narrow track vehicle may include one or more light outputs on each side of the narrow track vehicle. In examples, the light outputs may be any shape (e.g., circular, square, trapezoidal, hexagonal, etc.). In some examples, the light outputs may comprise of a single strip including a plurality of light outputs or may include a plurality of light outputs spaced a distance from each other. In some examples, the light outputs may be configured to emit a light pattern. For example, a first light pattern may be used to communicate that the narrow track vehicle is treating a single lane as two virtual lanes and a second light pattern may be used to communicate that the narrow track vehicle is actively performing a lane splitting process, etc.

Figure 4:
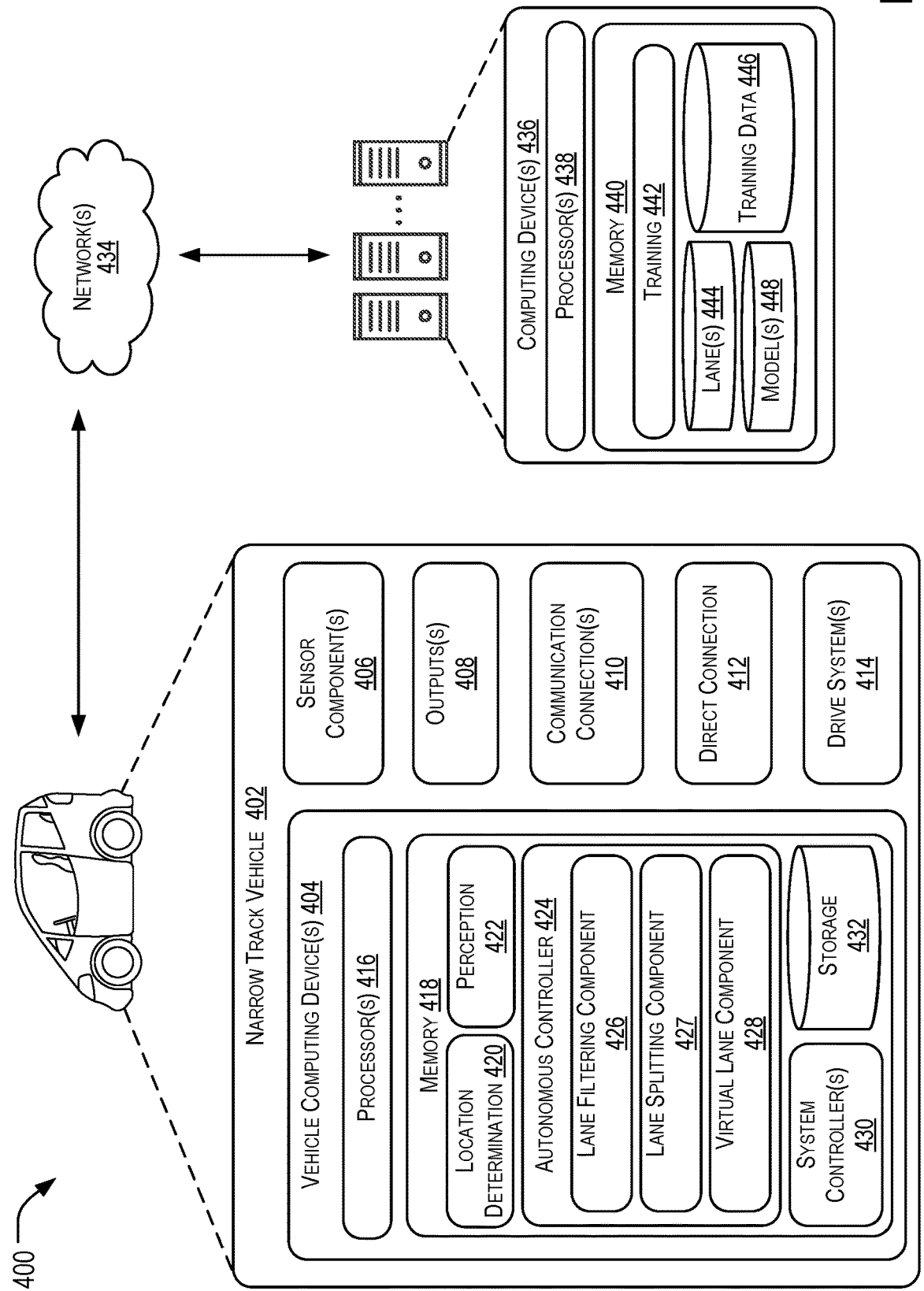
FIG. 4 is a block diagram illustrating an example system for performing techniques, as described herein.

FIG. 4 is a block diagram illustrating an example system 400 for performing techniques, as described herein. In at least one example, a narrow track vehicle 402 can include one or more vehicle computing devices 404, one or more sensor components 406, one or more output(s) 408, one or more communication connections 410, at least one direct connection 412, and one or more drive systems 414. In at least one example, a narrow track vehicle 402 can correspond to the narrow track vehicle 102 as described above with reference to FIGS. 1-3. In some examples, the narrow track vehicle 402 can be an autonomous vehicle. For example, the narrow track vehicle 402 can be an autonomous vehicle configured to operate according to a Level 5 classification issued by the U.S. National Highway Traffic Safety Administration, which describes a vehicle capable of performing all safety-critical functions for an entire trip, with the driver (or occupant) not being expected to control the vehicle at any time. In such an example, since the narrow track vehicle 402 can be configured to control all functions from start to stop, including all parking functions, it can be driverless. This is merely an example, and the components and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the narrow track vehicle 402 is an autonomous vehicle; however, the narrow track vehicle 402 could be any other type of vehicle. For instance, a manually driven (or semiautonomous) narrow track vehicle may include a driver assistance feature that incorporates a virtual lane component as described herein. In examples, the virtual lane component may visually present virtual lane indicators (or boundaries) on a user interface (e.g., on a head-up display on a windshield, on a window of the narrow track vehicle, on a display screen in the passenger compartment, etc.). Such visual indicators may assist the driver to control the narrow track vehicle to traverse a first virtual lane or a second virtual lane. For example, the virtual lane component may display a line on the windshield of the narrow track vehicle that visually divides a single lane into two virtual lanes.

The vehicle computing device(s) 404 can include processor(s) 416 and memory 418 communicatively coupled with the processor(s) 416. In the illustrated example, the memory 418 of the vehicle computing device(s) 404 stores a location determination component 420, a perception component 422, an autonomous controller 424, which can include a lane filtering component 426 and a virtual lane component 428, and one or more system controllers 430. Additionally, the memory 418 can include a storage 432, which can store map(s), model(s), etc. A map can be any number of data structures that are capable of providing data about an environment, such as, but not limited to, topologies (such as junctions, lanes, merging zones, crosswalks, etc.), streets, mountain ranges, roads, terrain, and the environment in general. Maps can be associated with real environments or simulated environments. Model(s) can include machine-trained models, as described below.

In at least one example, the location determination component 420 can determine a position and orientation of the narrow track vehicle 402 in relation to a map based at least in part on sensor data received from the sensor component(s) 406 and/or map data associated with a map. In at least one example, the location determination component 420 can include, or be associated with, a calibration component that is capable of performing operations for calibrating (determining various intrinsic and extrinsic parameters associated with any one or more of the sensor component(s) 406), location determination, and mapping substantially simultaneously.

In at least one example, the perception component 422 can detect and recognize objects based at least in part on sensor data received from the sensor component(s) 406. In at least one example, the perception component 422 can receive raw sensor data (e.g., from the sensor component(s) 406). In at least one example, the perception component 422 can receive sensor data and can utilize one or more processing algorithms to perform object detection or classification with respect to object(s) identified in the sensor data. In some examples, the perception component 422 can associate an object with an identified object and can associate a confidence metric associated with a classification of the identified object. In some examples, the perception component 422 can receive sensor data from the sensor component(s) 406, map data associated with a map (e.g., of the map(s) which can be in storage 432), and/or processed sensor data, and can output predictions associated with one or more objects within the environment of the narrow track vehicle 402. In at least one example, the perception component 422 can determine outputs, to use to control the narrow track vehicle 402 based at least in part on sensor data received from the sensor component(s) 406, map data, and/or any determinations made by the other components of the narrow track vehicle 402. In at least one example, such outputs can correspond to trajectories, as described herein.

In at least one example, the lane filtering component 426 can perform operations as described with reference to FIG. 2. That is, the lane filtering component 426 can utilize vehicle data associated with the narrow track vehicle 402 (e.g., a current position of the narrow track vehicle 402 and a current route of the narrow track vehicle 402), object data associated with other object(s) in the environment of the narrow track vehicle 402 (e.g., positions of the object(s) in the environment, size of object, type of object, etc.) and/or trajectory(s) associated therewith, or other environmental data (e.g., constraints in the environment such as parked vehicles, debris, or potholes in the road, construction equipment, etc.) and/or the narrow track vehicle 402, etc. as described above, to output data that indicates whether the narrow track vehicle 402 can move in between two adjacent lanes. As described above, the lane filtering component 426 can determine, using sensor data, a distance between a first object in a first lane and a second object in a second lane meets a threshold distance and control the narrow track vehicle to traverse in between the first object and the second object.

In at least one example, the lane splitting component 427 can perform operations as described with reference to FIG. 3. That is, the lane splitting component 427 can utilize vehicle data associated with the narrow track vehicle 402 (e.g., a current position of the narrow track vehicle 402 and a current route of the narrow track vehicle 402), object data associated with other object(s) in the environment of the narrow track vehicle 402 (e.g., positions of the object(s) in the environment, speed of the object(s) in the environment, size of object, type of object, etc.) and/or trajectory(s) associated therewith, or other environmental data (e.g., constraints in the environment such as parked vehicles, debris in the road, construction equipment, etc.) and/or the narrow track vehicle 402, etc. as described above, to output data that indicates whether the narrow track vehicle 402 can move in between two adjacent lanes. As described above, the lane splitting component 427 can use and/or process sensor data in order to determine distances between various objects, as well as distances between objects and the narrow track vehicle.

In at least one example, the virtual lane component 428 can perform operations as described above with reference to FIGS. 1-3. That is, the virtual lane component 428 can utilize vehicle data associated with the narrow track vehicle 402 (e.g., a current position of the narrow track vehicle 402 and a current route of the narrow track vehicle 402), object data associated with other object(s) in the environment of the narrow track vehicle 402 and/or trajectory(s) associated therewith, environmental data associated with the environment (e.g., parked vehicles, debris in the road) and/or lane data associated with a roadway as described above, to output data that indicates whether the narrow track vehicle can treat a single lane as two virtual lanes. As described above, the virtual lane component 428 can model virtual lanes on a roadway and determine which virtual lane the narrow track vehicle 402 should traverse based on a number of factors or circumstances such as location of the roadway (e.g., highway v. residential), types of objects in the environment, density of traffic, speed of traffic, or any of the other factors as discussed above with reference to FIGS. 1-3.

In some examples (e.g., where the narrow track vehicle 402 is not an autonomous vehicle), one or more of the aforementioned components can be omitted from the narrow track vehicle 402. While the components described above are illustrated as "onboard" the narrow track vehicle 402, in other implementations, the components can be remotely located and/or accessible to the narrow track vehicle 402. Furthermore, while the components are described above as "components," such components can comprise one or more components, which can be part of a system, for performing operations attributed to each of the components.

In at least one example, the location determination component 420, the perception component 422, and/or the autonomous controller 424 can process sensor data and can send their respective outputs over network(s) 434, to computing device(s) 436. In at least one example, the location determination component 420, the perception component 422, and/or the autonomous controller 424 can send their respective outputs to the computing device(s) 436 at a particular frequency, after a lapse of a predetermined period of time, in near real-time, etc.

In at least one example, the vehicle computing device(s) 404 can include one or more system controllers 430, which can be configured to control steering, propulsion, braking, safety, output(s), communication, and other systems of the narrow track vehicle 402. These system controller(s) 430 can communicate with and/or control corresponding systems of the drive system(s) 414 and/or other systems of the narrow track vehicle 402.

In at least one example, the sensor component(s) 406 can include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), time-of-flight (ToF) sensors, seat sensors, seatbelt sensors, weight sensors, etc. The sensor component(s) 406 can provide input to the vehicle computing device(s) 404. In some examples, the sensor component(s) 406 can preprocess at least some of the sensor data prior to sending the sensor data to the vehicle computing device(s) 404. In at least one example, the sensor component(s) 406 can send sensor data, via the network(s)

434, to the computing device(s) 436 at a particular frequency, after a lapse of a predetermined period of time, in near real-time, etc.

The narrow track vehicle 402 can also include one or more output(s) 408 for emitting light and/or sound. The output(s)) 408 may include interior audio and visual outputs (e.g., display(s), speaker(s), etc.) to communicate with passengers of the narrow track vehicle 402. In some examples, interior outputs can include speakers, lights, signs, display screens, touch screens, haptic outputs (e.g., vibration and/or force feedback), mechanical actuators (e.g., seatbelt tensioners, seat positioners, headrest positioners, etc.), and the like. The output(s) 408 may also include exterior outputs found on an exterior of the narrow track vehicle 402. In some examples, the exterior outputs may include light outputs (e.g., indicator lights, signs, light arrays, etc.) to visually communicate with pedestrians, other drivers, other nearby vehicles, etc., and/or one or more audio outputs (e.g., speakers, speaker arrays, horns, etc.) to audibly communicate with pedestrians, other drivers, other nearby vehicles, etc., etc. In at least one example, the output(s) 408 may be positioned at various locations about the exterior and/or interior of the narrow track vehicle 402. In at least one example, an audio output associated with the narrow track vehicle 402 may produce an exhaust sound or internal-combustion engine sound (e.g., a low-pitched, roaring sound) in order to alert drivers or pedestrians of the presence of the narrow track vehicle. In some examples, the narrow track vehicle 402 may include light outputs configured to visually communicate with pedestrians or other vehicles that the narrow track vehicle is actively treating a single lane as two virtual lanes or is about to perform a lane filtering or lane splitting process. In some examples, one or more light outputs on the narrow track vehicle 402 may visually communicate that the narrow track vehicle is actively performing a lane filtering or lane splitting process.

The narrow track vehicle 402 may also include communication connection(s) 410 that enable communication between the narrow track vehicle 402 and other local or remote computing device(s). For example, the communication connection(s) 410 can facilitate communication with other local computing device(s) on the narrow track vehicle 402 and/or the drive system(s) 414. Also, the communication connection(s) 410 may allow the narrow track vehicle to communicate with other nearby computing device(s) (e.g., other nearby vehicles, traffic signals, etc.). In some examples, the communications connection(s) 410 may include physical and/or logical interfaces for connecting the vehicle computing device(s) 404 to another computing device or a network, such as network(s) 434. For example, the communications connection(s) 410 may enable Wi-Fi-based communication such as via frequencies defined by the IEEE 802.11 standards, short range wireless frequencies such as BLUETOOTH©, or any suitable wired or wireless communications protocol that enables the respective computing device to interface with the other computing device(s). In some examples, the direct connection 412 may directly connect the drive system(s) 414 and other systems of the narrow track vehicle 402.

In at least one example, the narrow track vehicle 402 may include drive system(s) 414. In some examples, the narrow track vehicle 402 may have a single drive system 414. In at least one example, if the narrow track vehicle 402 has multiple drive systems 414, individual drive systems 414 may be positioned on opposite ends of the narrow track vehicle 402 (e.g., the front and the rear, etc.). In some examples, the narrow track vehicle 402 may include a ballast positioned between the front and rear wheels for stability. In at least one example, the drive system(s) 414 can include sensor component(s) to detect conditions of the drive system(s) 414 and/or the surroundings of the narrow track vehicle 402. By way of example and not limitation, the sensor component(s) may include wheel encoder(s) (e.g., rotary encoders) to sense rotation of the wheels of the drive system, inertial sensors (e.g., inertial measurement units, accelerometers, gyroscopes, magnetometers, etc.) to measure position and acceleration of the drive system, cameras or other image sensors, lidar sensors, radar sensors, etc. Some sensors, such as the wheel encoder(s), may be unique to the drive system(s) 414. In some examples, the sensor component(s) on the drive system(s) 414 may overlap or supplement corresponding systems of the narrow track vehicle 402 (e.g., sensor component(s) 406).

The drive system(s) 414 may include many of the vehicle systems, including a high voltage battery, a motor to propel the narrow track vehicle 402, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the narrow track vehicle 402), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive system controller which can receive and preprocess data from the sensor component(s) and to control operation of the various vehicle systems. In some examples, the drive system controller can include processor(s) and memory communicatively coupled with the processor(s). The memory can store one or more components to perform various functionalities of the drive system(s) 414. Furthermore, the drive system(s) 414 may also include communication connection(s) that enable communication by the respective drive system with other local or remote computing device(s).

In some examples, the vehicle computing device(s) 404, sensor component(s) 406, output(s) 408, and the communication connection(s) 410 may be located on an exterior of the narrow track vehicle 402. In some examples, aspects of the vehicle computing device(s) 404 may be distributed within the vehicle and/or other computing device(s) 436.

As described above, the narrow track vehicle 402 can send sensor data to the computing device(s) 436, via the network(s) 434. In some examples, the narrow track vehicle 402 can send raw sensor data to the computing device(s) 436. In other examples, the narrow track vehicle 402 can send processed sensor data and/or representations of sensor data to the computing device(s) 436 (e.g., data output from the location determination component 420, the perception component 422, and/or the autonomous controller 424). In some examples, the narrow track vehicle 402 can send sensor data to the computing device(s) 436 at a particular frequency, after a lapse of a predetermined period of time, in near real-time, etc. In some examples, such data can be associated with "logs" that can represent previous, or historical, behavior of the narrow track vehicle 402 over time.

The computing device(s) 436 can receive the sensor data (raw or processed) from the narrow track vehicle 402 and/or other data collection devices, as well as data from one or more third party sources and/or systems. In at least one example, the computing device(s) 436 can include processor(s) 438 and memory 440 communicatively coupled with the processor(s) 438. In the illustrated example, the memory 440 of the computing device(s) 436 stores a training component 442, lane(s) 444 (e.g., storing data associated with lanes, virtual lanes, lane filtering or lane splitting procedures, etc.), training data 446 (e.g., storing training data accessible to the training component 442), and model(s) 448 (e.g., models output by the training component 442). In some examples, one or more of the systems and/or storage repositories can be associated with the narrow track vehicle 402 or other computing device(s) associated with the system 400 instead of, or in addition to, being associated with the memory 440 of the computing device(s) 436.

In at least one example, the training component 442 can train model(s) based at least in part on the training data, which can be used for various operations as described herein. For example, the training component 442 can train model(s), using machine learning algorithms, that can be used by the location determination component 420, the perception component 422, and/or the autonomous controller 424. In some examples, aspects of some or all of the components discussed herein can include any models, algorithms, and/or machine-learning algorithms. In some examples, machine learning models may be trained to improve lane filtering and/or lane splitting processes. Such machine learning algorithms can include, but are not limited to, supervised learning models, unsupervised learning techniques, linear models (e.g., logistic regression, ridge regression, lasso regression), tree-based models (e.g., decision tree, random forests, gradient boosting regression, XGBoost, Light GBM Regressor, etc.), clustering (e.g., K-Means, hierarchical clustering, gaussian mixture models, etc.), and/or association (e.g., Apriori algorithm). In at least one example, the resulting model(s) can be stored in the model(s) 448 and/or the storage 432 on the narrow track vehicle 402 and can be accessed in near real-time by one or more components of the vehicle computing device(s) 404.

The processor(s) 416 of the narrow track vehicle 402 and the processor(s) 438 of the computing device(s) 436 can be any suitable processor capable of executing instructions to process data and perform operations as described herein. By way of example and not limitation, the processor(s) 416 and 438 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 418 and 440 are examples of non-transitory computer-readable media. Memory 418 and 440 can store an operating system and one or more software applications, instructions, programs, and/or data to implement the methods described herein and the functions attributed to the various systems. In various implementations, the memory can be implemented using any suitable memory technology, such as static random receive memory (SRAM), synchronous dynamic RAM (SDRAM), nonvolatile/Flash-type memory, or any other type of memory capable of storing data. The architectures, systems, and individual elements described herein can include many other logical, programmatic, and physical components, of which those shown in the accompanying figures are merely examples that are related to the discussion herein.

It should be noted that while FIG. 4 is illustrated as a distributed system, in some examples, components of the narrow track vehicle 402 can be associated with the computing device(s) 436 and/or the components of the computing device(s) 436 can be associated with the narrow track vehicle 402. That is, the narrow track vehicle 402 can perform one or more of the functions associated with the computing device(s) 436, and vice versa. Furthermore, in some examples, processing as described herein can be distributed across multiple processors (e.g., GPUs) for quick integration. In at least one example, each of the processors (e.g., GPUs) can process in parallel to speed up the time required for performing operations described herein.

Furthermore, while the vehicle computing device(s) 404 and the computing device(s) 436 are shown to include multiple components, in some examples, such components can be associated with more or fewer individual components. For example, in an example, a location determination component, a perception component, and/or an autonomous controller can be combined into a single component. Or, an evaluation component, a prediction component, a simulation component, and/or a training component can be combined into a single component. That is, while depicted as separate components, any one or more of the components can be combined.

CONCLUSION

Although the discussion above sets forth example implementations of the described techniques, other architectures can be used to implement the described functionality and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A narrow track autonomous vehicle comprising:
   a sensor disposed on the narrow track autonomous vehicle, the narrow track autonomous vehicle having a width that is at most half the width of a standard lane;
   one or more processors; and
   one or more computer-readable media storing instructions that, when executed by the one or more processors, configure the narrow track autonomous vehicle to perform operations comprising:
      receiving sensor data from the sensor;
      determining, based at least in part on the sensor data, that the narrow track autonomous vehicle is traversing a lane that is at least 10 feet wide;
      dividing, based at least in part on the lane being at least 10 feet wide, the lane into a first virtual lane associated with a left half of the lane and a second virtual lane associated with a right half of the lane;
      determining a lane type associated with the lane; and
      causing the narrow track autonomous vehicle to traverse one of the first virtual lane or the second virtual lane based at least in part on the lane type.

2. The narrow track autonomous vehicle of claim 1, the operations further comprising:
   determining, based at least in part on the sensor data, that the lane type is a highway lane; and controlling the narrow track autonomous vehicle to traverse the second virtual lane of the highway lane.

3. The narrow track autonomous vehicle of claim 1, the operations further comprising:
determining, based at least in part on the sensor data, that the lane type is a residential lane; and
controlling the narrow track autonomous vehicle to traverse the first virtual lane of the residential lane.

4. The narrow track autonomous vehicle of claim 1, the operations further comprising:
performing a virtual lane change operation based at least in part on one of:
detecting, based at least in part on the sensor data, an obstruction in one of the first virtual lane or the second virtual lane;
detecting, based at least in part on the sensor data, erratic behavior from an object in an adjacent lane;
detecting a turn signal to transition from the first virtual lane to the second virtual lane; or
detecting, based at least in part on the sensor data, another object traversing the first virtual lane ahead of the narrow track autonomous vehicle.

5. The narrow track autonomous vehicle of claim 1, wherein the lane is a first lane, the operations further comprising:
determining, based at least in part on the sensor data, that a first object is traversing the first lane ahead of the narrow track autonomous vehicle;
determining, based at least in part on the sensor data, that a second object is traversing a second lane adjacent the first lane;
determining, based at least in part on the sensor data, that the first object and the second object are traveling at or below a threshold speed;
determining, based at least in part on the sensor data, a distance between a first side of the first object and a second side of the second object meets a threshold distance; and
controlling the narrow track autonomous vehicle to traverse in between the first object in first lane and the second object in the second lane in order to overtake the first object and the second object.

6. The narrow track autonomous vehicle of claim 5, wherein controlling the narrow track autonomous vehicle to overtake the first object and the second object includes controlling an overtaking speed of the narrow track autonomous vehicle to be below a maximum overtaking speed.

7. The narrow track autonomous vehicle of claim 1, wherein the lane is a first lane, the operations further comprising:
determining, based at least in part on the sensor data, that the narrow track autonomous vehicle is approaching an intersection;
detecting a first object in the first lane in front of the narrow track autonomous vehicle;
detecting a second object in a second lane adjacent the first lane;
determining, based at least in part on the sensor data, a distance between the first object and a first side of the narrow track autonomous vehicle meets a threshold distance;
determining, based at least in part on the sensor data, a distance between the second object and a second side of the narrow track autonomous vehicle meets the threshold distance; and
controlling the narrow track autonomous vehicle to traverse in between the first lane and the second lane.

8. The narrow track autonomous vehicle of claim 1, wherein the lane is a first lane, the operations further comprising:
determining, based at least in part on the sensor data, that a first object is traversing the first lane ahead of the narrow track autonomous vehicle;
detecting a second object in a second lane adjacent the first lane;
determining, based at least in part on the sensor data, that the first object is driving below a threshold speed;
determining, based at least in part on the sensor data, a distance between a first side of the first object and a second side of the second object meets a threshold distance; and
controlling the narrow track autonomous vehicle to traverse in between the first object and the second object.

9. The narrow track autonomous vehicle of claim 1, further comprising:
determining, based at least in part on the sensor data, that the lane is less than 9 feet wide; and
refraining from dividing the lane into the first virtual lane and the second virtual lane and treating the lane as a single lane.

10. The narrow track autonomous vehicle of claim 1, the operations further comprising:
determining, based at least in part on the sensor data, that the lane type is a passing lane; and
controlling the narrow track autonomous vehicle to traverse the second virtual lane.

11. The narrow track autonomous vehicle of claim 1, wherein a first width of the first virtual lane and a second width of the second virtual lane is based at least in part on the lane type.

12. A system comprising:
a narrow vehicle having a vehicle width that is at most half a width of a standard lane;
a sensor disposed on the narrow vehicle;
one or more processors; and
one or more computer-readable media storing instructions that, when executed by the one or more processors, configure the narrow vehicle to perform operations comprising:
receiving sensor data from the sensor;
determining, based at least in part on the sensor data, that the narrow vehicle is traversing a lane that is at or above a threshold lane width;
based at least in part on the lane being at or above the threshold lane width, defining a first virtual lane associated with a right half of the lane and a second virtual lane associated with a left half of the lane, wherein the first virtual lane has a first width and the second virtual lane has a second width different than the first width; and
causing the narrow vehicle to traverse one of the first virtual lane or the second virtual lane.

13. The system of claim 12, wherein the lane is a first lane, the operations further comprising:
detecting, based at least in part on the sensor data, a second lane adjacent the first lane;
determining, based at least in part on the sensor data, that the second lane is at or above the threshold lane width; and
based at least in part on the second lane being at or above the threshold lane width, defining a third virtual lane associated with a left half of the second lane and a fourth virtual lane associated with a right half of the second lane.

14. The system of claim 12, the operations further comprising:
  determining that a speed of traffic traversing the lane is at or below 45 mph; and
  causing the narrow vehicle to traverse the second virtual lane associated with the left half of the lane.

15. The system of claim 12, the operations further comprising:
  determining that a speed of traffic traversing the lane is at or above 50 mph; and
  causing the narrow vehicle to traverse the first virtual lane associated with the right half of the lane.

16. The system of claim 12, the operations further comprising:
  determining, based at least in part on the sensor data, that the lane is below the threshold lane width; and
  refraining from defining the lane into the first virtual lane and the second virtual lane and treating the lane as a single lane.

17. A method comprising:
  receiving sensor data from a sensor associated with a narrow vehicle traversing an environment, the narrow vehicle having a vehicle width of less than 60 inches;
  determining, based at least in part on the sensor data, a lane in the environment is at or above a threshold lane width;
  dividing the lane into a first virtual lane representing a first side of the lane and a second virtual lane representing a second side of the lane; and
  causing the narrow vehicle to traverse one of the first virtual lane or the second virtual lane based at least in part on a speed of traffic traversing the lane.

18. The method of claim 17, further comprising:
  determining, based at least in part on the sensor data, the lane is a highway lane; and
  controlling the narrow vehicle to traverse the second virtual lane representing the second side of the highway lane.

19. The method of claim 17, further comprising:
  determining, based at least in part on the sensor data, the lane is a residential lane; and
  controlling the narrow vehicle to traverse the first virtual lane representing the first side of the residential lane.

20. The method of claim 17, further comprising:
  determining, based at least in part on the sensor data, the lane is below the threshold lane width; and
  dividing the lane into the first virtual lane having a first virtual lane width and the second virtual lane having a second virtual lane width different than the first virtual lane width.

* * * * *